No. 671,661.  
B. A. SLOCUM.  
CAMERA HOLDING TRIPOD.  
(Application filed Oct. 30, 1899. Renewed Jan. 21, 1901.)

Patented Apr. 9, 1901.

(No Model.)

WITNESSES:  
A. M. Tuttle  
M. O'Callaghan

INVENTOR:  
Benj. A. Slocum  
by his Attorney,  
C. B. Tuttle

UNITED STATES PATENT OFFICE.

BENJAMIN A. SLOCUM, OF LYNN, MASSACHUSETTS.

CAMERA-HOLDING TRIPOD.

SPECIFICATION forming part of Letters Patent No. 671,661, dated April 9, 1901.

Application filed October 30, 1899. Renewed January 21, 1901. Serial No. 44,209. (No model.)

*To all whom it may concern:*

Be it known that I, BENJAMIN A. SLOCUM, of Lynn, county of Essex, and Commonwealth of Massachusetts, have invented certain Improvements in Camera-Holding Tripods, of which the following, read in connection with the accompanying drawings, is a specification.

This invention is represented as embodied in a stand or tripod for holding cameras, and has for its purpose to provide means adapted for holding the camera at different angles of inclination and means for ready adjustment of the camera horizontally to different angles of vision, all of which is more specifically pointed out hereinafter.

Figure 1:
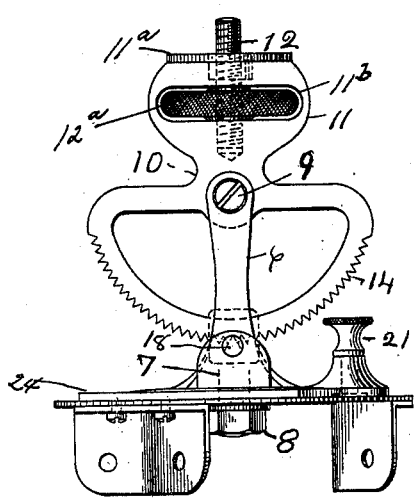
Figure 2:
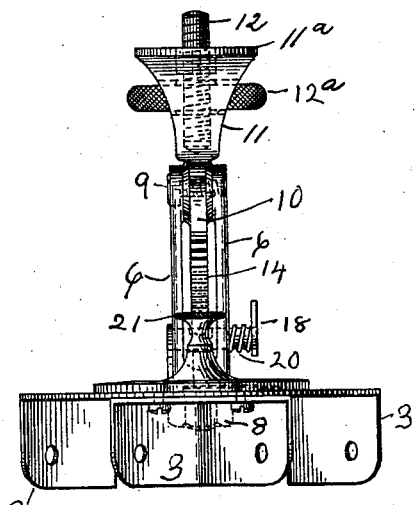
Figure 3:
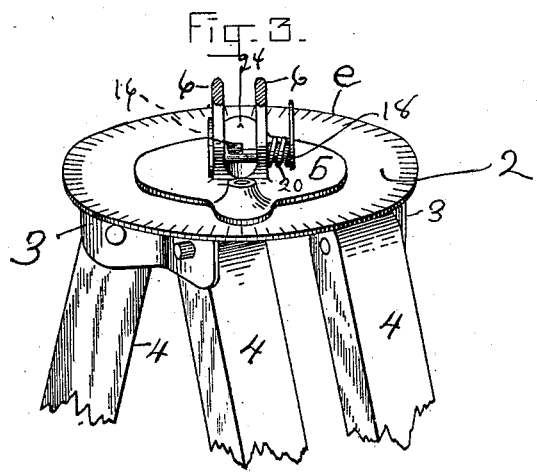

In the drawings, Figure 1 is a side elevation of a camera-stand or tripod provided with my improvements. Fig. 2 is an edge elevation thereof, and Fig. 3 is a sectional perspective of the base-plate and connections.

2 designates the base-plate or tripod-head, and 3 designates the angle-brackets on the under side thereof for receiving the tripod-legs. On the upper face of the base-plate is pivoted a horizontally-turning carrier-plate 5, provided with a central vertical pivot-screw 7, which extends down through the base-plate and is there provided with a nut 8, by removing which the two plates may be separated. The upper side of the carrier-plate 5 is provided with parallel uprights 6 6, between which swings the vertical sector 10, having peripheral teeth 14, said sector being mounted on the horizontal pin or screw 9, carried by the upper ends of the said uprights. The sector 10 is provided with an extension or arm 11, having a flat upper face or plate 11ª, on which the camera rests and to which it is held by means of a vertical screw 12, mounted in said extension or arm 11 and adapted at its upper end to engage with a suitable pocket and threaded opening in the camera. The screw 12 is operated by a horizontal nut 12ª thereon and mounted in an opening 11ᵇ in the extension or arm 11.

The horizontally-turning plate 5 is held in its adjusted position by means of a vertical screw 21, mounted in a boss or enlargement 21ª with its lower end in engagement with the base-plate 2. By loosening this screw the plate 5, and with it the camera, may be turned horizontally to any desired position and there held by tightening said screw.

18 designates a horizontal slide mounted in the lower ends of uprights 6 and provided therebetween with a pin or projection 16 to normally engage the toothed periphery 14 of the sector 10, and 20 is the spring mounted on the slide between its finger-piece and the outer side of one of the uprights 6 and serving to hold the pin or projection in engagement with one of the teeth 14. The slide 18 is formed of a transverse bar having the right-hand portion of its upper portion lying between the uprights 6 6 cut away, as shown in Fig. 3, so that the uncut portion will form a projection or pin 16 to move laterally into and out of engagement with the tooth 14. When the slide is pushed inwardly, the projection or pin will be moved out of engagement with tooth 14 and the cut-away part of the slide will come directly under the toothed edge 14 and not engage the same. By pushing the slide 18 inwardly the pin or projection will be moved out of the tooth 14, whereupon the sector 10, and with it the camera, may be swung vertically on the axis 9 to the desired extent and then locked by releasing the pressure on the locking-slide.

The carrier-plate 5 is of less diameter than the base-plate 2 and is provided with a pointer 24 diametrically opposite its adjusting-screw 21, and the base-plate 2 is graduated, as at e, on its upper face. All this is designed for assisting the operator who may desire to obtain panoramic views, several adjustments of the camera being accurately measurable by reference to the pointer and graduations and due regard for the field of the lens used in the camera.

Having now described my invention, what I claim is—

1. The combination of a base-plate, of a horizontally-adjustable carrier-plate pivoted centrally on the base-plate and provided with uprights, a toothed sector pivoted to swing vertically between said uprights, a locking-slide to engage the toothed edge of the sector and lock it in its adjusted position, said sector having an extension or arm with a flat face on which the camera may rest, and a camera-engaging screw mounted in said extension or arm; substantially as described.

2. A camera-holder comprising a base-plate provided with attaching means for the tripod-legs, a carrier-plate pivoted centrally on the base-plate and provided with a vertical set-screw engaging the base-plate and with uprights, a toothed sector pivoted between said uprights, a spring-pressed locking-slide engaging the toothed edge of the sector; said sector being provided with an arm or extension having a flat upper face, and a transverse opening, a camera-securing screw crossing said opening and a nut on the screw within said opening, substantially as described.

3. The combination with the base-plate, of the horizontal carrier-plate pivoted centrally on the base-plate and provided with means for securing it in its adjusted position, uprights on the carrier-plate, a toothed segment pivoted between said uprights, a spring-pressed locking-slide mounted in the lower ends of the uprights and provided therebetween with a pin or projection in engagement with the toothed edge of the sector, and means for securing a camera to the sector; substantially as described.

Signed by me at Lynn, Massachasetts, this 26th day of October, 1899.

BENJ. A. SLOCUM.

Witnesses:
C. B. TUTTLE,
A. M. TUTTLE.